US007020613B2

(12) United States Patent
Chang et al.

(10) Patent No.: US 7,020,613 B2
(45) Date of Patent: Mar. 28, 2006

(54) METHOD AND APPARATUS OF MIXING AUDIOS

(75) Inventors: Pao-Chi Chang, Chungli (TW); Ching-Chang Chen, Feng Yuan (TW)

(73) Assignee: AT Chip Corporation, (TW)

( * ) Notice: Subject to any disclaimer, the term of this patent is extended or adjusted under 35 U.S.C. 154(b) by 730 days.

(21) Appl. No.: 10/202,863

(22) Filed: Jul. 26, 2002

(65) Prior Publication Data

US 2003/0023428 A1 Jan. 30, 2003

(30) Foreign Application Priority Data

Jul. 27, 2001 (TW) .............................. 90118500 A

(51) Int. Cl.
*G10L 11/00* (2006.01)
*H04M 3/56* (2006.01)

(52) U.S. Cl. ...................... 704/278; 370/264; 348/14.1

(58) Field of Classification Search .................... None
See application file for complete search history.

(56) References Cited

U.S. PATENT DOCUMENTS

| | | | | | |
|---|---|---|---|---|---|
| 4,516,156 | A | * | 5/1985 | Fabris et al. | 348/14.1 |
| 4,577,229 | A | * | 3/1986 | de la Cierva et al. | 348/512 |
| 5,365,265 | A | * | 11/1994 | Shibata et al. | 348/14.1 |
| 5,402,418 | A | * | 3/1995 | Shibata et al. | 370/264 |
| 5,483,588 | A | * | 1/1996 | Eaton et al. | 379/202.01 |
| 5,636,218 | A | * | 6/1997 | Ishikawa et al. | 370/401 |
| 6,016,295 | A | * | 1/2000 | Endoh et al. | 369/47.16 |

* cited by examiner

*Primary Examiner*—David D. Knepper

(57) ABSTRACT

A method and system of mixing audios to convert a plurality of input voices into a single output voice is described. The system of mixing audios has a decoding device, an audio mixing device and a frame package unit. The input voices including a plurality of audio frames are partially decoded to acquire audio parameters of the input voices by the decoding device. One audio frame of the input voices is selected by the audio mixing device to obtain a target frame according to the audio parameters later. The target frame is then packaged so as to be identical to the original format of the input voices by the frame package unit.

35 Claims, 4 Drawing Sheets

METHOD AND APPARATUS OF MIXING AUDIOS

FIELD OF THE INVENTION

The present invention generally relates to a method and system of mixing audios, and more particularly, to a method and system of mixing a plurality of input voices to convert these input voices into a single output voice to play in a variety of audio players for a network meeting.

BACKGROUND OF THE INVENTION

With the rapid development of computer and communication techniques, communication manners have increasingly changed from single direction to multi-direction for mutual interactions. Such a tendency and a network are widely used and attract a lot of attention in digital communication applications, such as analog signals being converted into digital signals. Digital audio coding and speech synthesis in particular have been more and more important in recent years.

However, the technique of mixing audios is essential to the network meeting. Since digital audio coding is standard for the voice over Internet protocol (VOIP), a small-scale or a large-scale enterprise usually largely utilizes the VOIP to perform a digital coding for network meeting. Unfortunately, the waveform coding must execute a direct coding procedure to complete the audio mixing. There is still a disadvantage of audio transmission in the network.

FIG. 1 shows a view of a network meeting system using half-duplex voice transmission in the prior art. The network meeting system has a computer server 100, a multi-point control unit (MCU), for a control center of meeting procedures. During the network meeting, every speaker talks one-way over a network connection by a microphone (102*a*–102*d*). Further, one speaker must wait for another speaker to complete a speech. That is, the speech of the speaker is merely transmitted into the computer server using half-duplex voice transmission by communication equipment 104*a*–104*d*, such as a client server, a microphone or network devices (104*a*–104*d*).

The computer server 100 then controls the network meeting. An interrupt or a polling procedure is used to process the audios from all speakers. The audios of the speakers must be completely decoded in the computer server 100 to mix the audios. Finally, the decoded audios are entirely encoded again. Therefore, to meet the original format of the audio, the computer server engages in extensive computation and of high complexity to transmit the decoded audios into the client computer.

However, since the audios are conveyed in half-duplex, one speaker 102*a* only can talk in one period and a participant 102*b* answers the speaker in the next period. As a result, a voice transmission delay always occurs to reduce the efficiency of the network meeting and communication is not live.

FIG. 2 shows block diagrams of a network meeting system using full-duplex voice transmission in the prior art. The network meeting system has a total decoder 200, a mixer 202 and an audio compression device 204. The audio is completely decoded by the total decoder 200 after receiving the audio. A plurality of decoded audios is obtained and then the decoded audios are synthesized into a mixed audio by the mixer 202 executing a superposition. Finally, the mixed audio is entirely encoded to a mixed audio stream and conveyed to all participants.

For the network meeting system with full-duplex voice transmission, the received audios have to be decoded to an individual audio data to perform an audio mixing. Therefore, the more the participants, the more the decoded and encoded time increases since a total decoder is provided. The computation complexity and transmission delay cause inefficiency in the network meeting. Also, the total decoder increases the overall cost of the network meeting.

SUMMARY OF THE INVENTION

One object of the present invention is to utilize a method of mixing audios to convert a plurality of input voices into a single output voice to be transmitted to a variety of audio players for a network meeting.

Another object of the present invention is to use a method of mixing audios to reduce the computation complexity by decoding a portion of the input voices.

Still another object of the present invention is to use a method of mixing audios so that the target frame is packaged in a manner identical to the original audio format and has a better sense of hearing.

According to the above objects, the present invention sets forth a method and system of mixing audios to transmit input voices. Each input voice is partly decoded to acquire audio parameters of the input voice. One audio frame of the input voices is later selected as a target frame by the audio parameters. The target frame is then packaged so as to be identical to the original format of the input voices.

A portion of each input voice is decoded to acquire a plurality of audio parameters responsive to the input voices. An audio decision and a classification of the audio parameters responsive to the input voices are then performed to determine an audio type of each input voice. A header verification unit further verifies the headers of the audio frames of the input voices to determine audio classes of the audio frames.

If the audio classes of the audio frames responsive to the two input voices are transition frames or reserved frames, the audio frames of one input voice are selected as target frames. Afterwards, the target frame is packaged to generate a plurality of output voices having a format identical to the input voices to convey readily the output voices.

A target frame is selected from the audio frames of the input voices according to the audio types of the audio frames. If one audio frame is quasi-voice and the other is quasi-dumb, a voice selector directly selects the one with quasi-voice as the target frame. Finally, the target frame is packaged to generate a plurality of output voices having format identical to the input voices.

The system for mixing audios has a decoding device, an audio mixing device and a frame package unit. The decoding device allows a portion of each input voice to be decoded to acquire a plurality of audio parameters responsive to the input voices such that each input voice is compactly encoded and has a plurality of audio frames.

Specifically, the audio mixing device used to select one of the audio frames on the basis of the audio parameters of the input voices has a header verification unit, an audio identification unit, an excitation computation unit, an adaptive selecting unit and a voice selector. The header verification unit is able to check a title of the audio frames to determine a plurality of audio classes of the audio frames. The audio classes of the audio frames include voiced frames, transition frames and reserved frames.

The audio identification unit is used to determine precisely the audio types of the input voices. The threshold of two audio frames defined as a pitch gain threshold and a pitch difference threshold serve as feature parameters of the input voices. The excitation computation unit can compute a signal intensity of an excitation signal including an adaptive excitation signal or a fixed excitation signal. The voice selector is able to select a voice data stream. In addition, the adaptive selecting unit is used to select a target frame from the audio frames. If the audio types of the audio frames are transition frames or reserved frames, these frames are selected as target frames.

The frame package unit is capable of packaging the target frame for generating a plurality of output voices having a format identical to the input voices to convey the output voices.

As a result, the present invention utilizes a method and system of mixing audios by a full-duplex mode so that the participants can simultaneously talk to one another to obtain a comprehensible content of the input voices. That is, the input voices are decoded partially so as to omit an additional decoder for mixing the input voices with multi-channel. Additionally, the present invention can be applied to a mixing audio having a tree structure for input voices with channel.

In summary, the present invention provides a method and system of mixing a plurality of input voices to be converted into a single output voice. The bandwidth of the network communication is saved and the transmission delay of the output voice is reduced due to a single output voice. Further, using a partial decoding can reduce the computation complexity when the input voices are mixed together. More importantly, the target frame is packaged so as to be identical to original audio format and have a better sense of hearing.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENT

The present invention is directed to a method and system of mixing audios to convert a plurality of input voices into a single output voice to be transmitted to a variety of audio players for a network meeting. As a result, the audio players simultaneously receive the single output voice to allow the participants of the network meeting to hear clearly the output voice from speakers. Moreover, the bandwidth used for the single output voice is equal to that of one input voice to save occupied bandwidth of the input voices. To explain clearly the present invention, an example of two input voices applied to the method and system of mixing audios is set forth in detail as follows.

Figure 1:
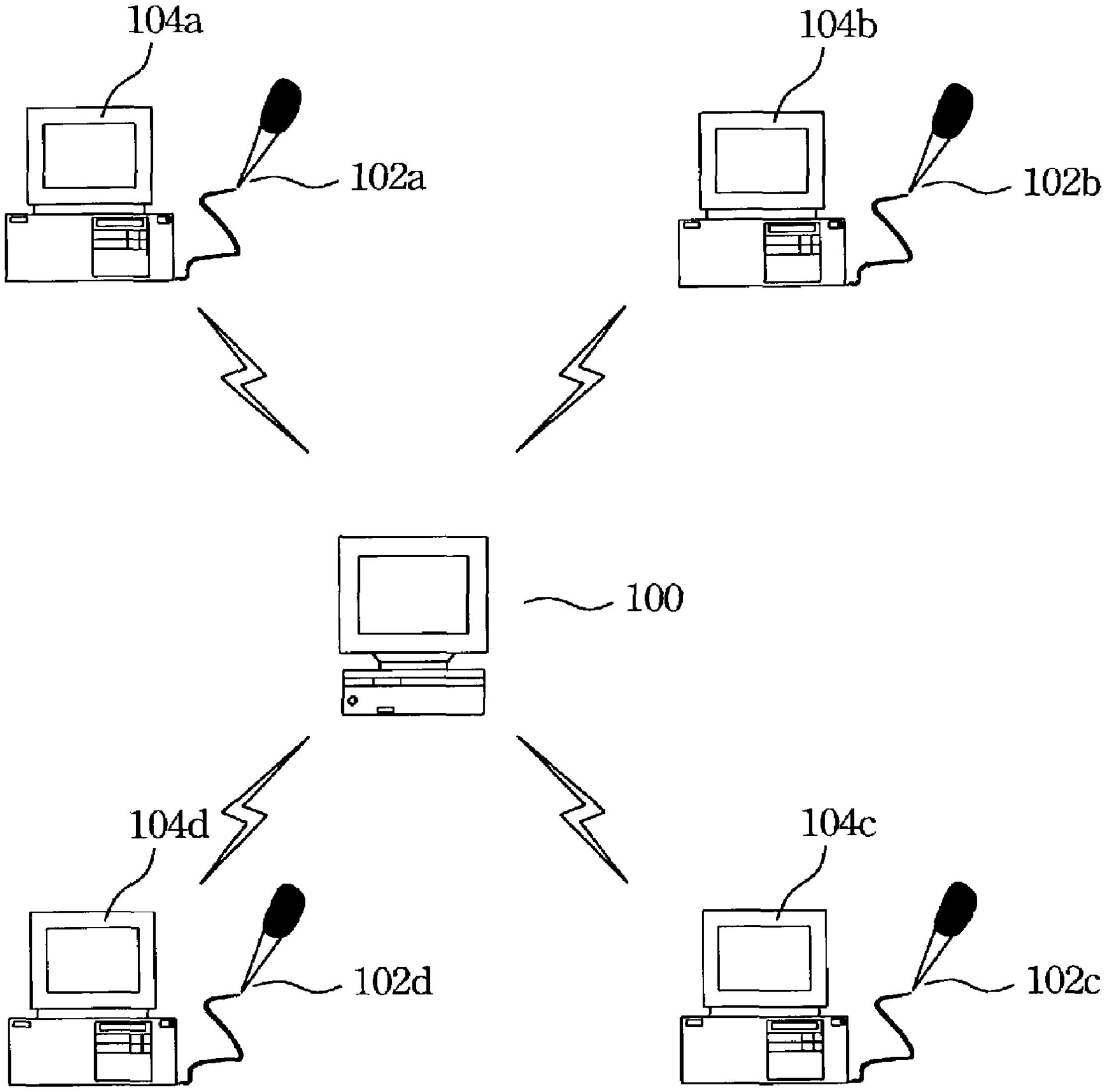
FIG. 1 (PRIOR ART)
FIG. 1 illustrates a network meeting system using a half-duplex voice transmission in the prior art.
Figure 2:
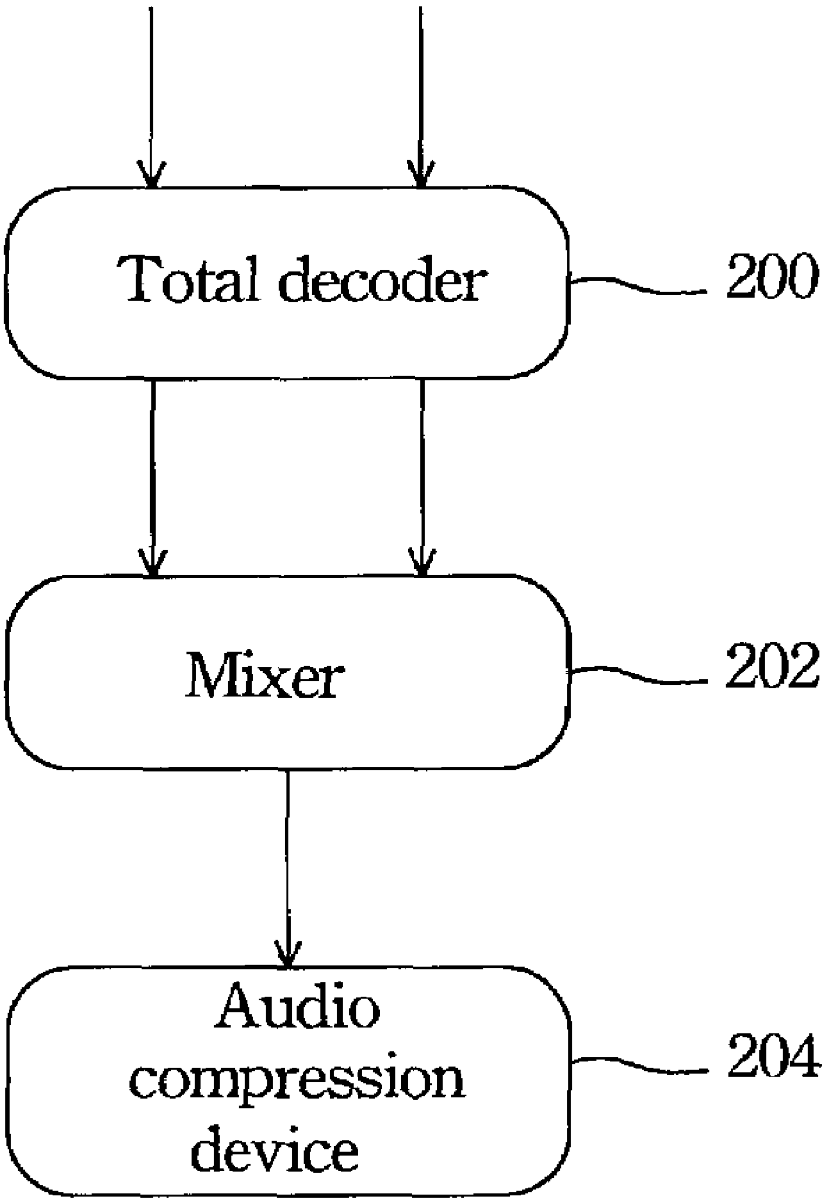
FIG. 2 (PRIOR ART)
FIG. 2 illustrates a block diagram of a network meeting system using a full-duplex voice transmission in the prior art.
Figure 3:
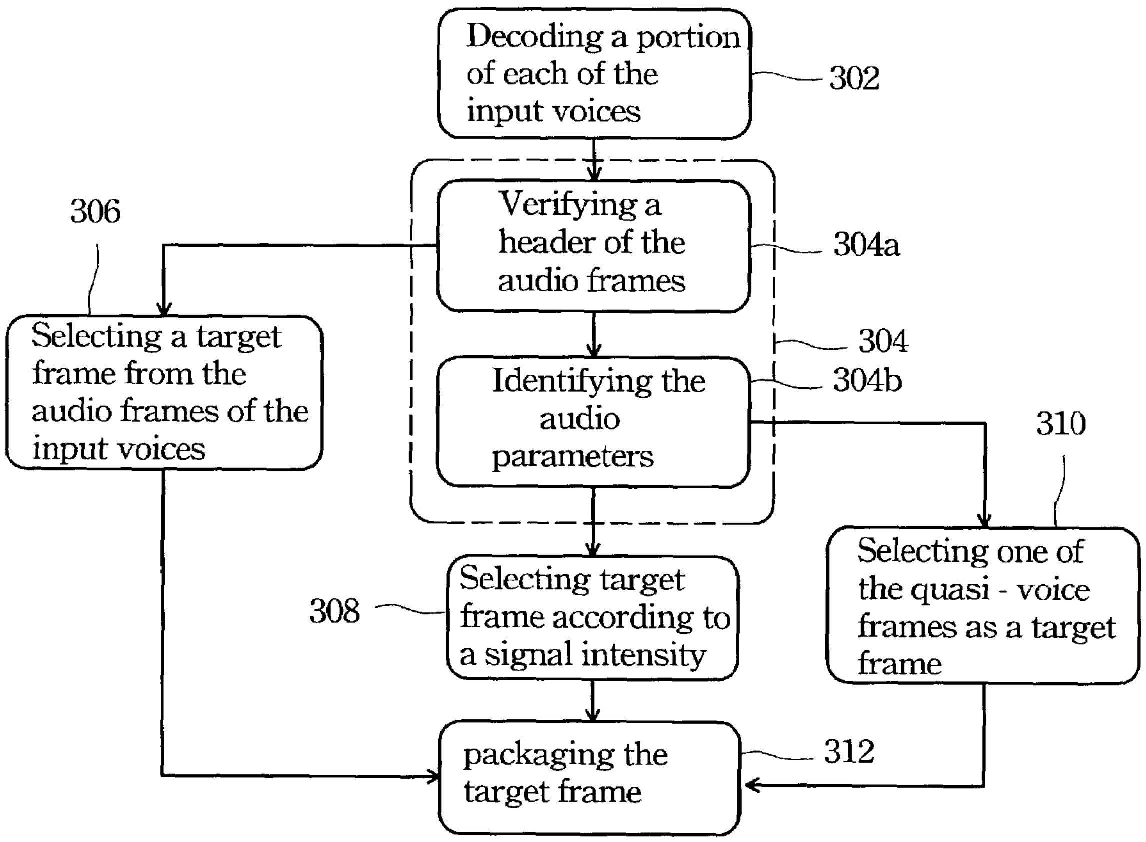
FIG. 3 is a flowchart of a method of mixing audios to transmit input voices in accordance with a preferred embodiment of the present invention.

FIG. 3 shows a flowchart of a method of mixing audios to transmit input voices in accordance with a preferred embodiment of the present invention. Each input voice is decoded to acquire audio parameters of the input voice. One audio frame of the input voices is selected as a target frame by the audio parameters later. The target frame is then packaged so as to be identical to original format of the input voices.

In step 302, a portion of each input voice is decoded to acquire a plurality of audio parameters responsive to the input voices. Each of the input voices is compactly coded and has a plurality of audio frames. In a preferred embodiment of the present invention, during the decoding step, a parameter decoding is executed in a parameter decoder. The parameter decoding includes a code excited linear prediction (CELP) algorithm performed by a plurality of audio parameters or audio coding standards, such as G.723.1 and G.729. The audio parameters have smooth and regular patterns including a pitch, a pitch gain, a fixed codebook vector, a fixed codebook gain and a combination thereof.

Additionally, the bit rate, computation complexity and transmission delays of the input voices have been taken into consideration when using the parameter decoding. Specifically, an initial codebook serves as an excitation signal source suitable for a bit rate range of about 4.8 kbps to 16 kbps when a CELP algorithm is used. Therefore, the method and system of mixing audios according to the present invention result in a higher audio quality and lower complexity.

In step 304, an audio decision and classification of the audio parameters responsive to the input voices are performed to determine an audio type of each input voice in step 304*b*. A header verification unit further verifies the headers of the audio frames of the input voices to determine audio classes of the audio frames in step 304*a*. The audio classes of the audio frames include voiced frames, transition frames and reserved frames. The voiced frames have a pitch, such as a vowel sound. The transition frames are several turning points of speech tones of the input voices, such as a silence insertion descriptor (SID) and background noises. The reserved frames also include random noises not transmitted, such as some header information.

In step 306, if the audio classes of the audio frames responsive to the two input voices are transition frames or reserved frames, the audio frames of one input voice are selected as target frames. Afterwards, proceeding to step 312, the target frame is packaged to generate a plurality of output voices having a format identical to the input voices to convey readily the output voices.

Specifically, if the two audio frames are silence insertion descriptors (SIDs), a current target frame is selected according to a previous audio frame. The previous audio frame is first input voice, for example, the current target frame is regarded as a desired audio frame with respect to the first input voice. If only one audio frame is a voiced frame or a silence insertion descriptor (SID), the voiced frame in the input voice is selected as the target frame. If the both audio frames are reserved frames, one audio frame of either one input voice or the other is selected as the target frame.

If the audio classes of the audio frames responsive to the two input voices are voiced frames, the audio parameters are identified to determine further the audio type of each of the input voices 304*b*. The thresholds of the audio frames are defined as a pitch gain threshold and a pitch difference threshold, respectively, serving as feature parameters of the input voices.

In operation, a pitch difference is computed according to a current audio frame and a previous audio frame of each input voice in an audio identification unit. The audio types of the audio frames preferably include a quasi-voice frame or a quasi-dumb frame. The quasi-dumb is also called as quasi-unvoice to indicate partial unvoice frames. If the pitch of the audio frames is smaller than the pitch gain threshold, and the pitch difference is greater than the pitch difference threshold, the audio frames are referred to as quasi-dumb by an audio identification unit. If not so, the audio frames are referred to as quasi-voice by an audio identification unit.

In the preferred embodiment of the present invention, a plurality of pitch difference absolute values of the audio frames are computed sequentially by a backward computation and adding the pitch difference absolute values to obtain a sum of the pitch difference absolute values.

In step 308, a target frame is selected from the audio frames of the input voices according to the audio types of the audio frames. There are preferably many combinations with respect to the audio frames. For example, the audio frames are quasi-voice or the audio frames are quasi-dumb. Alternatively, one of the audio frames is quasi-voice and the other is quasi-dumb. Specifically, for an example of the CELP algorithm, the quasi-voice is coded by an adaptive codebook and the quasi-dumb is coded by a fixed codebook.

If the two audio frames are quasi-voice, they are compared and the audio frame with a high signal intensity is selected according to an adaptive codebook in an adaptive selecting unit. Also, if the two audio frames are quasi-dumb, they are compared and the audio frame with a high signal intensity is selected according to an adaptive codebook in an adaptive selecting unit. In step 310, if one audio frame is quasi-voice and the other is quasi-dumb, a voice selector directly selects the one with quasi-voice as the target frame.

In step 312, the target frame is packaged to generate a plurality of output voices having a format identical to the input voices. The output voices are then instantly transmitted to a variety of audio players for a network meeting, such as network telephone meeting, so that the participants and speakers are able to listen to the output voices.

Figure 4:
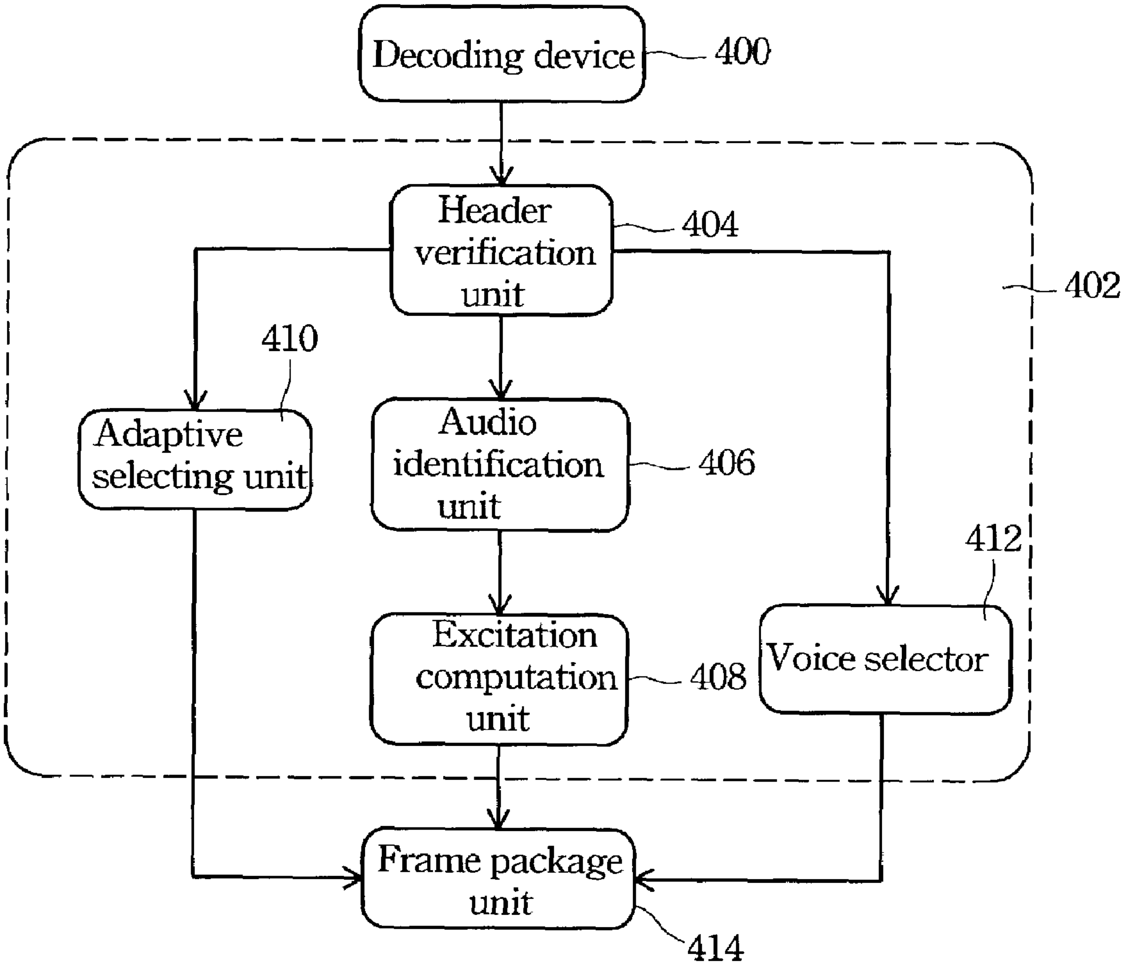
FIG. 4 illustrates a block diagram of a system of mixing audios to transmit input voices in accordance with a preferred embodiment of the present invention.

FIG. 4 shows a block diagram of a system of mixing audios to transmit input voices in accordance with a preferred embodiment of the present invention. The system of mixing audios has a decoding device 400, an audio mixing device 402 and a frame package unit 414. The decoding device 400 allows a portion of each input voice to be decoded to acquire a plurality of audio parameters responsive to the input voices, in which each input voice is compactly encoded and has a plurality of audio frames.

The audio mixing device 402 has a header verification unit 404, an audio identification unit 406, an excitation computation unit 408, an adaptive selecting unit 410 and a voice selector 412. Specifically, the audio mixing device 402 coupled to the decoding device 400 is used to select one of the audio frames on the basis of the audio parameters of the input voices.

The header verification unit 404 coupled to the decoding device 400 is able to check a title of the audio frames to determine a plurality of audio classes of the audio frames. The audio classes of the audio frames include voiced frames, transition frames and reserved frames, in which the audio frames has a pitch, the transition frames are turning points of speech tones, and the reserved frames include non-transmitted frames.

The audio identification unit 406 coupled to the header verification unit 404 is used to determine precisely the audio types of the input voices. The audio types of the audio frames include a quasi-voice frame or a quasi-dumb. The threshold of two audio frames defined as a pitch gain threshold and a pitch difference threshold serve as feature parameters of the input voices. Moreover, a plurality of pitch difference absolute values are computed sequentially by a backward computation and adding the pitch difference absolute values to obtain a sum of the pitch difference absolute values.

The excitation computation unit 408 coupled to the audio identification unit 406 can compute a signal intensity of an excitation signal including an adaptive excitation signal or a fixed excitation signal. The voice selector 412 coupled to the header verification unit 404 is able to select a voice data stream. If one audio frame is quasi-voice and the other is quasi-dumb, a voice selector 412 directly selects the one with quasi-voice as the target frame.

The adaptive selecting unit 410 coupled to the header verification unit 404 and the frame package unit 414 is used to select a target frame from the audio frames. If the audio types of the audio frames are transition frames or reserved frames, these frames are selected as target frames. The frame package unit 414 coupled to the excitation computation unit 408, the adaptive selecting unit 410 and the voice selector 412, respectively, are capable of packaging the target frame for generating a plurality of output voices having an identical format to the input voices to convey the output voices.

According to the above-mentioned, the present invention utilizes a method and system of mixing a plurality of input voices to be converted into a single output voice for a variety of audio players in the network meeting. There are many advantages to the present invention. For example, the bandwidth of the network communication is saved and the transmission delay of the output voice is reduced due to a single output voice. Further, using a partial decoding to acquire the audio parameters of the input voices for a target frame can reduce the computation complexity when the input voices are mixed altogether. More importantly, the target frame is packaged so as to be identical to original audio format for benefit of network transmission. In addition, the output voice generated by the present invention has a better sense of hearing than that of the prior art.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method of mixing audios to transmit a plurality of input voices, said method comprising the steps of:

decoding a portion of each of said input voices to acquire a plurality of audio parameters responsive to said input voices to reduce a transmission delay of said input voices, wherein each of said input voices is compactly encoded and includes a plurality of audio frames;

performing an audio decision and classification on said audio parameters responsive to said input voices to determine an audio type of each of said input voices;

selecting a target frame from said audio frames of said input voices according to a signal intensity of said audio frames; and packaging said target frame to generate a plurality of output voices having an audio format identical to said input voices to convey readily said output voices.

2. The method of claim 1, wherein the step of decoding said portion of each of said input voices comprises executing a parameter decoding in a parameter decoder.

3. The method of claim 2, wherein the step of executing a parameter decoding comprises executing a CELP algorithm in said parameter decoder.

4. The method of claim 1, wherein said audio parameters includes a pitch signal, a pitch gain, a fixed codebook vector, a fixed codebook gain or a combination thereof.

5. The method of claim 1, wherein the step of performing said audio decision and classification further comprises the steps of:

verifying a header of said audio frames to determine a plurality of classes of said audio frames; and identifying said audio parameters responsive to said input voices to determine said audio type of each of said input voices.

6. The method of claim 5, wherein the step of identifying said audio parameters comprises using a pitch gain threshold and a pitch difference threshold.

7. The method of claim 5, wherein the step of performing said audio decision and classification comprises computing sequentially a plurality of pitch difference absolute values of said audio frames by a backward computation and adding said pitch difference absolute values to obtain a sum of said pitch difference absolute values.

8. The method of claim 1, wherein said audio type of each of said input voices includes a quasi-voice frame, a quasi-dumb frame or a combination thereof.

9. The method of claim 8, wherein the step of selecting a target frame from said audio frames comprises selecting one of said audio frames having a higher signal intensity in adaptive excitation signals responsive to said input voices as said target frame if said input voices includes totally quasi-voice frames.

10. The method of claim 8, wherein the step of selecting a target frame from said audio frames comprises selecting one of said audio frames having a higher signal intensity in adaptive excitation signals responsive to said input voices as said target frame if said input voices includes totally quasi-dumb frames.

11. The method of claim 8, wherein the step of selecting a target frame from said audio frames comprises selecting one of said audio frames having a higher signal intensity in adaptive excitation signals responsive to said input voices as said target frame if said input voices includes a single quasi-dumb frame.

12. A method of mixing audios to transmit a plurality of input voices, said method comprising the steps of:

decoding a portion of each of said input voices to acquire a plurality of audio parameters responsive to said input voices to reduce a transmission delay of said input voices, wherein each of said input voices compactly encoded includes a plurality of audio frames;

performing an audio decision and classification on said audio parameters responsive to said input voices to determine an audio type of each of said input voices, wherein the step of performing said audio decision and classification further comprises the steps of:

verifying a header of said audio frames to determine a plurality of classes of said audio frames; and identifying said audio parameters responsive to said input voices to determine said audio type of each of said input voices;

selecting a target frame from said audio frames of said input voices according to a signal intensity of said audio frames; and packaging said target frame to generate a plurality of output voices having an identical audio format to said input voices to convey readily said output voices.

13. The method of claim 12, wherein the step of decoding said portion of each of said input voices comprises executing a parameter decoding in a parameter decoder.

14. The method of claim 13, wherein the step of executing a parameter decoding comprises executing a CELP algorithm in said parameter decoder.

15. The method of claim 12, wherein said audio parameters include a pitch, a pitch gain, a fixed codebook vector, a fixed codebook gain or a combination thereof.

16. The method of claim 12, wherein the step of verifying a header of said audio frames to determine a plurality of classes of said audio frames include a voice frame, a transition frame, a reserved frame or a combination thereof.

17. The method of claim 12, wherein the step of identifying said audio parameters comprises using a pitch gain threshold and a pitch difference threshold.

18. The method of claim 12, wherein the step of performing said audio decision and classification comprises computing sequentially a plurality of pitch difference absolute values of said audio frames by a backward computation and adding said pitch difference absolute values to obtain a sum of said pitch difference absolute values.

19. The method of claim 12, wherein said audio type of each of said input voices includes a quasi-voice frame, a quasi-dumb frame or a combination thereof.

20. The method of claim 19, wherein the step of selecting a target frame from said audio frames comprises selecting one of said audio frames having a higher signal intensity in adaptive excitation signals responsive to said input voices as said target frame if said input voices includes totally quasi-voice frames.

21. The method of claim 12, wherein the step of selecting a target frame from said audio frames comprises selecting one of said audio frames having a higher signal intensity in adaptive excitation signals responsive to said input voices as said target frame if said input voices includes totally quasi-dumb frames.

22. The method of claim 12, wherein the step of selecting a target frame from said audio frames comprises selecting one of said audio frames having a higher signal intensity in adaptive excitation signals responsive to said input voices as said target frame if said input voices includes a single quasi-dumb frame.

23. An apparatus for mixing audios to transmit a plurality of input voices, said apparatus comprising:

a decoding device for decoding a portion of each of said input voices to acquire a plurality of audio parameters responsive to said input voices to reduce a transmission delay, wherein each of said input voices compactly encoded includes a plurality of audio frames;

an audio mixing device coupled to said decoding device for selecting one of said audio frames on the basis of said audio parameters of said input voices, wherein said audio mixing device further comprises:

a header verification unit coupled to said decoding device for checking a title of said audio frames to determine a plurality of classes of said audio frames;

an audio identification unit coupled to said header verification unit for determining an audio type of each of said input voices by a pitch difference absolute value of said audio frames and a pitch gain of said audio parameters;

an excitation computation unit coupled to said audio identification unit for computing a signal intensity of an excitation signal to determine said signal intensity of said audio frames;

an adaptive selecting unit coupled to said header verification unit for selecting a target frame from said audio frames; and a voice selector coupled to said header verification unit to select a voice data stream; and a frame package unit coupled to said excitation computation unit, said adaptive selecting unit and said voice selector, respectively, to package said target frame for generating a plurality of output voices having a format identical to said input voices to convey readily said output voices.

24. The audio mixing system of claim 23, wherein said decoding device comprises a parameter decoder for executing a parameter decoding.

25. The audio mixing system of claim 24, wherein said decoding device comprises a CELP algorithm executed on said parameter decoder.

26. The audio mixing system of claim 23, wherein said audio parameters include a pitch, a pitch gain or a combination thereof.

27. The audio mixing system of claim 23, wherein said audio parameters include a pitch, a pitch gain, a fixed codebook vector, a fixed codebook gain or a combination thereof.

28. The audio mixing system of claim 23, wherein said classes of said audio frames include a voice frame, a transition frame, a reserved frame or a combination thereof.

29. The audio mixing system of claim 23, wherein said audio identification unit comprises a pitch gain threshold and a pitch difference threshold.

30. The audio mixing system of claim 23, wherein said identification unit computes sequentially a plurality of pitch difference absolute values of said audio frames by a backward computation and obtains a sum of said pitch difference absolute values by an addition of said pitch difference absolute values.

31. The audio mixing system of claim 23, wherein said excitation signal includes a self-adaptive excitation signal, a fixed excitation signal or a combination thereof.

32. The audio mixing system of claim 23, wherein said audio type of each of said input voices includes a quasi-voice frame, a quasi-dumb frame or a combination thereof.

33. The audio mixing system of claim 32, wherein said adaptive selecting unit of said audio mixing device selects one of said audio frames having a higher signal intensity responsive to said input voices as said target frame if said input voices includes totally quasi-voice frames.

34. The audio mixing system of claim 32, wherein said adaptive selecting unit of said audio mixing device selects one of said audio frames having a higher signal intensity responsive to said input voices as said target frame if said input voices includes totally quasi-dumb frames.

35. The audio mixing system of claim 32, wherein said adaptive selecting unit of said audio mixing device selects one of said audio frames having a higher signal intensity responsive to said input voices as said target frame if said input voices includes a single quasi-dumb frame.

* * * * *